United States Patent [19]

Rauch et al.

[11] Patent Number: 4,816,558

[45] Date of Patent: Mar. 28, 1989

[54] METHOD FOR MAKING REDISPERSIBLE SYNTHETIC RESIN POWDERS

[75] Inventors: Hubert Rauch, Weiterstadt; Wolfgang Klesse, Mainz; Klaus Lehmann, Rossdorf; Theodor Mager, Darmstadt, all of Fed. Rep. of Germany

[73] Assignee: Röhm GmbH, Darmstadt, Fed. Rep. of Germany

[21] Appl. No.: 78,239

[22] Filed: Jul. 27, 1987

[30] Foreign Application Priority Data

Feb. 2, 1987 [DE] Fed. Rep. of Germany ....... 3702997

[51] Int. Cl.⁴ ............................. C08F 6/24; C08J 3/12
[52] U.S. Cl. .................................... 528/501; 528/503; 523/342; 524/832; 264/12; 34/10
[58] Field of Search ................. 523/342; 528/501, 499, 528/503; 524/832; 34/10; 264/12

[56] References Cited

U.S. PATENT DOCUMENTS

| | | | |
|---|---|---|---|
| 3,325,425 | 6/1967 | Bray, Jr. | 523/342 X |
| 3,950,302 | 4/1976 | Rauterkus et al. | 260/42.52 |
| 4,112,215 | 9/1978 | Boessler et al. | 528/503 |
| 4,520,172 | 5/1985 | Lehmann et al. | 525/369 |

FOREIGN PATENT DOCUMENTS

| | | | |
|---|---|---|---|
| 0073296 | 5/1982 | European Pat. Off. | 528/501 |
| 3405651 | 8/1985 | Fed. Rep. of Germany | 528/501 |
| 1393374 | 5/1975 | United Kingdom | 528/501 |

*Primary Examiner*—Joseph L. Schofer
*Assistant Examiner*—F. M. Teskin
*Attorney, Agent, or Firm*—Curtis, Morris & Safford

[57] ABSTRACT

A method for obtaining redispersible powders of a copolymer having a dynamic glass transition temperature, $T_{max}$, below 150° C., by spray drying an aqueous dispersion thereof having a minimum film forming temperature, MFT, using an inlet temperature $T_i$ and an outlet temperature $T_o$ such that $MFT < T_i < T_{max}$ and $MFT < T_o < 65°$ C.

8 Claims, No Drawings

METHOD FOR MAKING REDISPERSIBLE SYNTHETIC RESIN POWDERS

The present invention relates to a method for making a redispersible synthetic resin powder by drying a synthetic resin dispersion of an acrylic resin copolymer containing carboxyl groups and having a minimum film forming temperature of less than 60° C., said copolymer having a dynamic glass transition temperature $T_{\lambda max}$ below 150° C.

The Prior Art

German Patent Publication No. 25 12 238 describes the production of a powdered acrylic resin with a high carboxyl-group content by spray drying an aqueous dispersion. It is pointed out that the minimum film forming temperature should not be exceeded in spray drying if the latex particles of the dispersion are not to agglomerate by sintering into glassy particles but are to remain intact as loose aggregates. While the particle temperature will be considerably lower than the air temperature so long as the droplets of the dispersion still contain considerable water, so that the air temperature could initially be higher than the minimum film forming temperature, with increasing dewatering of the droplets the air temperature must drop below the minimum film forming temperature.

In German Patent Publication No. 32 08 791, it is emphasized that the presence of non-glassy, loosely aggregated latex particles is a prerequisite for the redispersibility of a powdered polymer. Since it has been believed, for the reasons stated, that such a structure could be obtained only by not exceeding the minimum film forming temperature in spray drying, that method of producing a powder from a dispersion containing carboxyl groups could not be utilized if the dispersion in question had a low minimum film forming temperature. According to this patent publication, dispersions of polymers containing substantial amounts of acrylate esters and which have a low minimum film forming temperature because of the greater softness of the polymers, are, as a result, converted to redispersible powders by the more expensive freeze drying method.

German Patent Publication No. 22 22 033 describes the production of a redispersible powder from a synthetic resin dispersion having a low minimum film forming temperature. Only by using a special polymer composition of a vinyl ester, ethylene, and acrylamide has it become possible to preserve redispersibility even though the air temperature at the entrance to the dryer is far above the minimum film forming temperature. However, this teaching cannot be translated to other polymer compositions.

According to German Patent Publication No. 34 05 651, bimodal dispersions are spray dried to form powders in the granules of which the latex particles may be either loosely aggregated or sintered or fused together to a greater or lesser extent, depending on the drying conditions. The inlet temperature of the air blown in, which ranges from 110° C. to 250° C., for example, and more particularly from 130° C. to 200° C., is far above the glass transition temperature of the polymer. At the outlet of the dryer, the powder particles attain the temperature of the air stream. With final temperatures that are close to the glass transition temperature but not appreciably above it, intermediate states between loose aggregation and a completely glassy state can be obtained. In the actual practice of the method, the air temperature in the dryer usually drops from 130° C.–200° C. at the inlet to 65° C.–80° C. at the outlet. If a dispersion of a synthetic resin having a high content of carboxyl groups, a dynamic glass transition temperature $T_{\lambda max}$ of less than 150° C., and a minimum film forming temperature of less than 60° C. were spray dried under such conditions, a heavy wall buildup of polymer agglomerated by sintering would form in the dryer.

THE OBJECT AND THE INVENTION

The present invention seeks to make it possible to convert aqueous dispersions having a high carboxyl group content to redispersible powders by means of the simple and low cost spray drying method even if the dispersions have a minimum film forming temperature below 60° C. Such powders are of great importance in the field of coatings for pharmaceutical products, for example, since the redispersions can be processed at moderate temperatures. In spray drying, heavy buildups of polymer agglomerated by sintering that are different to remove from the walls must definitely be prevented.

It has been found that these objectives can be attained by spray drying the synthetic resin dispersion at an inlet temperature that is below the dynamic glass transition temperature but above the minimum film forming temperature and at an outlet temperature that is below 65° C. but above the minimum film forming temperature. The drying air and the atomized dispersion are preferably conducted concurrently through the dryer.

By the inlet temperature, $T_i$, is meant the temperature of the air stream in the spray dryer at which the latex droplets enter the air stream. Similarly, the outlet temperature, $T_o$, is the temperature at which they are separated from the air stream. The dynamic glass transition temperature, $T_{\lambda max}$, is the maximum damping temperature in the torsion vibration test in conformity with DIN 53445. $T_{\lambda max}$ is dependent on the composition of the polymer. The minimum film forming temperature, MFT, in conformity with DIN 53787 is the lowest temperature at which a thin layer of a synthetic resin dispersion will dry to a cohesive film. It is dependent on the softness of the dispersed polymer, among other factors. In the case of the polymers having a high content of carboxyl groups used in accordance with the present invention, it should be noted that the latex particles dispersed in the aqueous phase are softer, due to swelling by water, than is a dried polymer film formed therefrom. In typical cases, the minimum film forming temperature is 60° C. or more below the dynamic glass transition temperature, whereas with dispersions that contain few, or are free of, carboxyl groups, the difference is much smaller.

The method of the invention is carried out at a lower inlet temperature than are the usual spray drying methods. The difference between the inlet and outlet temperatures is smaller than in the known methods. This manifests itself in an increased air throughput in relation to the amount of water to be evaporated. The energy input is determined by the amount of water evaporated and remains constant. What is extraordinary is that the entire drying process takes place at temperatures above the minimum film forming temperature, which up to now has been regarded as the upper limit for the outlet temperature.

As a consequence of the relatively high outlet temperature, the powder particles are usually glassy at the outlet, because the minimum film forming temperature has been exceeded. They appear translucent under a microscope and present the resistance to comminution that is characteristic of synthetic resins. Surprisingly, the particles produced in accordance with the invention are readily and completely redispersible in an aqueous alkali solution even though they are glassy.

The Dispersion

The dispersion used in spray drying may be prepared by known methods. Suitable copolymers therein contain from 20 to 60 percent by weight of units of acrylic acid and/or methacrylic acid, 40 to 80 percent by weight of units of lower alkyl esters of acrylic acid and/or methacrylic acid or mixtures of such esters with styrene, and from 0 to 10 percent by weight of further comonomers different from the aforementioned monomers but free-radically copolymerizable therewith. These copolymers have a minimum film forming temperature below 60° C. and a dynamic glass transition temperature below 150° C.—preferably between 60° C. and 150° C. Particularly preferred is the range from 100° C. to 140° C. Suitable lower alkyl esters of acrylic or methacrylic acid are those having from 1 to 8, and preferably from 1 to 4, carbon atoms, preferably the methyl, ethyl, and n-butyl esters. The composition of the polymer preferably includes at least one alkyl ester of acrylic acid. Styrene may replace a portion of the acrylic or methacrylic acid esters, but preferably not more than half. As a rule, the copolymer does not contain units of further monomers; however, such units may account for up to 10 weight percent of its composition. In particular, these may be crosslinking comonomers containing two or more double bonds susceptible of free radical polymerization, such as acrylic or methacrylic (i.e. vinylic) groups. Further examples are units of acrylamide or methacrylamide and their N-alkyl derivatives, of alkyl esters of acrylic acid and methacrylic acid having more than 8 carbon atoms in the alkyl group, or of hydroxyalkyl esters of unsaturated polymerizable carboxylic acids.

The greater the number of units of acrylic or methacrylic acid in the copolymer, the greater the difference between the minimum film forming temperature and the dynamic glass transition temperature with otherwise identical comonomers. Both temperatures will increase with an increase in the amount of such acid units, but the dynamic glass transition temperature will increase more markedly than the minimum film forming temperature. The invention is of particular importance for the spray drying of dispersions wherein the spread between these two temperatures is greater than 50° C. The dispersions treated are preferably dispersions containing copolymers whose minimum film forming temperatures are below 50° C., and more particularly below 40° C. Even dispersions of copolymers having a minimum film forming temperature below 35° C. can be dried.

The preparation of synthetic resin dispersions having a content of carboxyl groups is known from German Patent Publication No. 21 35 073 and from European Patent No. 73,296.

It is advisable to use dispersions with as high a solids content as possible in the process of the invention. The solids content may range from 10 to 60 percent and preferably ranges from 20 to 40 percent by weight. To be able to atomize the dispersion of fine droplets, its viscosity should not exceed 4000 mPa.sec. Advantageously the viscosity is less than 1000, and particularly less than 100, mPa.sec.

As a rule, the dispersion will contain an anionic emulsifier in a concentration from 0.03 to 3 percent, for example, by weight of the water phase. In addition, it may contain up to 5 percent by weight, for example, of non-ionic emulsifiers, which, if desired, may be present as the only emulsifiers.

The Spray Drying Process

For the drying of aqueous synthetic resin dispersions, so called spray towers are used. Details of their design and operation will be found in K. Masters, *Spray Drying Handbook*, 4th Ed., 1985, published by George Godwin, Ltd. They are usually operated concurrently, primarily with downward flow. In this case, the hot air and the dispersion are introduced at the top of the spray tower. The air temperature decreases from top to bottom due to the energy expended in evaporating the water. The dispersion is atomized at the top of the spray tower to fine droplets, which is accomplished by means of spray nozzles or, more often, by a rapidly rotating perforated disk into which the dispersion is caused to flow. The powder particles formed collect at the base of the spray tower in the so called cone or are separated from the air stream in a cyclone separator.

To obtain high drying capacity, the dryer is usually operated with maximum air throughput. Before it enters the spray tower, the air is heated to an inlet temperature, $T_i$, that is lower than the dynamic glass transition temperature $T_{\lambda max}$ of the polymer to be dried, but higher than the minimum film forming temperature. The difference between the latter and the inlet air temperature may be small, for example, between 5° C. and 20° C. Frequently, however, a greater difference, for example, from 20° C. to 50° C., will be more advantageous. The optimum inlet temperature usually has to be determined empirically in the spray tower because the design of the latter influences the optimum temperature level. If the inlet temperature, $T_i$, is too high, the polymer is likely to encrust the walls of the spray tower. Surprisingly, however, this risk is avoided although the air temperature is maintained above the minimum film forming temperature throughout the spray tower.

The dynamic glass transition temperature, $T_{\lambda max}$, of the emulsion polymers handled in the process of the invention ranges from 60° C. to 150° C., and preferably from 100° C. to 140° C. The minimum film forming temperature, MFT, of the dispersion is less than 60° C. and ranges from 5° C. to 50° C., for example. These temperatures determine the narrow range over which the process of the invention can be practiced. In typical cases, the inlet temperature, $T_i$, ranges from 60° C. to 100° C. and the outlet temperature, $T_o$, from 30° C. to 60° C., and the difference between these two temperatures does not exceed 65° C. This temperature spread advantageously ranges from 30° C. to 50° C. and should be the smaller the lower the inlet temperature, $T_i$.

By means of the feed rate of the dispersion, the outlet temperature, $T_o$, can be regulated with constant air throughput and without changing the inlet temperature. Increasing the amount of dispersion atomized in unit time results in more heat being abstracted from the air stream for evaporation of the water contained in the dispersion, and this lowers the outlet temperature, $T_o$. Conversely, the outlet temperature, $T_o$, can be raised by reducing the feed rate. With constant air and dispersion throughput, the outlet temperature, $T_o$, increases and decreases to the extent that the inlet temperature, $T_i$, is being varied. Under these conditions, there will be either no buildup on the walls of the spray tower or only a very slight buildup which is readily removed.

The Polymer Powder

After its separation from the air stream, the polymer powder usually has a residual moisture content of from 0.1 to 7, and preferably from 0.5 to 5, percent by weight. The powder particles have an average size ranging from 10 to 500, and preferably from 20 to 200, microns. They are hard and nontacky. In a micrograph magnified 100X they appear sharply defined, white to cloudy or clear translucent, which indicates more or less pronounced coalescence or fusion of the latex particles to a glassy state.

Glassy powder particles have in the past been regarded as unsuited for redispersion to give a latex. Surprisingly, however, the powders dried in accordance with the present invention can be redispersed by stirring in an aqueous alkaline medium. The amount of alkali present in the aqueous medium must be less than the amount required for complete neutralization of the carboxyl groups as otherwise the polymer will dissolve or the dispersion will thicken considerably. Crosslinked polymers will not dissolve and therefore occasionally tolerate a large amount of alkali than do uncrosslinked polymers. If the carboxyl groups were already partially neutralized prior to spray drying, the powder can be redispersed in pure water or in neutral aqueous media. Through such redispersion, a film forming latex is obtained in which the polymer is again largely present in the form of the original latex particles. It can be used conventionally in the production of coatings for pharmaceutical products. Alkali soluble coatings can also be produced from the redispersions for other fields of application. In addition, the powders produced in accordance with the invention are suitable for use as thickeners for alkaline aqueous media.

A better understanding of the present invention and of its many advantages will be had from the following Examples, given by way of illustration.

EXAMPLES 1-4

Preparation of Dispersions (A) 56 g of ammonium persulfate and 840 g of the sodium salt of a sulfated adduct prepared from triisobutylphenol and 7 moles of ethylene oxide were dissolved in 56 g of distilled water at 80° C. in a Witt jar equipped with a reflux condenser, stirrer, and feed vessel. A monomer mixture previously prepared from 12 kg of ethyl acrylate, 12 kg of methacrylic acid, and 48 g of 2-ethylhexyl thioglycolate were added dropwise to the resulting solution over a period of 4 hours at 80° C. with stirring. On completion of this addition, the batch was maintained at 80° C. for another 2 hours, then cooled at room temperature and filtered through a fine mesh stainless steel woven wire screen.

A low viscosity, finely divided dispersion was obtained. The minimum film forming temperature of the copolymer therein was 29° C., and the glass transition temperature, $T_{\lambda max}$, 129° C.

(B) The procedure of Example (A) was used, except 6.4 kg of a 5 percent NaOH solution were stirred into the dispersion after cooling to room temperature, and the dispersion was then filtered.

(C) 0.028 kg of ammonium peroxodisulfate and about 28 kg of the sodium salt of a sulfated adduct prepared from triisobutyl phenol (NaSA) and 7 moles of ethylene oxide were dissolved in 56 kg of distilled water at 80° C. in a 100 liter stainless steel reactor equipped with a reflux condenser, stirrer and feed vessel. A monomer mixture previously prepared from 12 kg of ethyl acrylate, 4.75 kg of methyl methacrylate, 7.2 kg of methacrylic acid and 0.5 kg of glycol dimethacrylate was added dropwise to the resulting solution over a period of 4 hours at 80° C. with stirring. On completion of this addition the batch was maintained at 80° C. for another 2 hours, then cooled at room temperature and filtered through a fine mesh stainless steel woven wire screen.

A low viscosity, finely divided dispersion was obtained, the minimum film forming temperature (MFT) of the copolymer therein was 25° C., the glass transition temperature $T_{\lambda max}$ was 84° C.

(D) Polymerization was carried out as described under (C) except that the following composition was used Prearranged in the reactor:
  0.056 kg of ammonium peroxodisulfate
  0.23 kg of NaSA
  56.00 kg of demineralized water
Monomers added:
  13.2 kg of ethyl acrylate
  3.6 kg of styrene
  7.2 kg of methacrylic acid A low viscosity, finely divided dispersion was obtained
  MFT=24° C.
  $T_{\lambda max}$=80° C.

Drying of the Dispersions

A spray dryer equipped with a disk atomizer rotating at high speed (20,000 rpm) and operated concurrently with hot air was used for the drying of the dispersion. The throughput of drying air was 400 m³/hour. The quantity ratio of dispersion to air was set so that the atomized material exited from the dryer at the desired outlet air temperature as a dry powder. The inlet and outlet temperatures of the drying air were varied. The results so obtained are presented in the following Table.

TABLE

| Example | Dispersion | $T_i$ (°C.) | $T_o$ (°C.) | $T_i$-$T_o$ (K) | Residual moisture (%) | Wall buildup in spray tower |
|---|---|---|---|---|---|---|
| 1 | (A) | 93 | 40 | 53 | 3.5 | Readily removable moderate buildup |
| 2 | (A) | 85 | 40 | 45 | 3.5 | ⎫ |
| 3 | (A) | 74 | 35 | 39 | 3.7 | ⎬ Readily removable light buildup |
| 4 | (A) | 65 | 30 | 35 | 5.2 | ⎭ |
| Comparative test | (A) | 137 | 67 | 70 | Not determined | Heavy sintered buildup |
| 5 | (B) | 90 | 40 | 50 | 3.9 | Readily removable light buildup |
| 6 | (C) | 79 | 44 | 35 | — | Readily removable light buildup |
| 7 | (D) | 77 | 45 | 32 | — | Readily removable light buildup |

Redispersing the Powders 600 g of water were introduced in each case into a vessel holding from 1.5 to 2 liters and 300 g each of the powders obtained in Examples 1 to 4 were stirred into it in portions. After stirring for about 5 to 10 minutes, 100 ml of 0.4 percent caustic soda solution were added dropwise over a period of 5 minutes with stirring and stirring was continued for another 60 minutes. Stable, finely divided, film forming dispersions were obtained in all cases.

300 g of the powder obtained in Example 5 from dispersion (B) were stirred into 700 g of demineralized water and stirring was continued for another 30 minutes. A stable, finely divided, film forming dispersion was obtained.

What is claimed is:

1. A method for making a redispersible synthetic resin powder which comprises spray drying an aqueous dispersion of a synthetic resin, said dispersion having a minimum film forming temperature below 60° C. and containing a dispersed copolymer having a dynamic glass transition temperature below 150° C. and comprising from 20 to 60 percent by weight of at least one member selected from the group consisting of acrylic acid and methacrylic acid, from 40 to 80 percent by weight of at least one member selected from the group consisting of esters of acrylic acid with an alkanol having 1 to 8 carbon atoms, esters of methacrylic acid with an alkanol having 1 to 8 carbon atoms, and mixtures of such esters with styrene, and from 0 to 10 percent by weight of at least one further unsaturated comonomer free-radically copolymerizable therewith, at an inlet temperature below the dynamic glass transition temperature of said copolymer but higher than the minimum film forming temperature of said dispersion and at an outlet temperature below 65° C. but above said minimum film forming temperature.

2. A method as in claim 1 wherein said copolymer comprises carboxylic acid units partly present in their salt form.

3. A method as in claim 1 performed with concurrent flow of air and dispersion.

4. A method as in claim 1 wherein the ratio of the amounts of drying air to atomized dispersion is such that the difference between the inlet and outlet temperatures is not greater than 65° C.

5. A method as in claim 1 wherein said dispersion has a minimum film forming temperature at least 50° C. below the dynamic glass transition temperature of the copolymer therein.

6. A method as in claim 1 wherein said dispersion has a minimum film forming temperature below 50° C.

7. A method as in claim 6 wherein said dispersion has a minimum film forming temperature below 40° C.

8. A method as in claim 7 wherein said dispersion has a minimum film forming temperature below 35° C.

* * * * *